United States Patent [19]
Tozu et al.

[11] Patent Number: 5,505,532
[45] Date of Patent: Apr. 9, 1996

[54] SKID CONTROL SYSTEM

[75] Inventors: Kenji Tozu; Kenji Asano; Hiroaki Kawai, all of Aichi, Japan

[73] Assignee: Aisin Seiki Kabushiki Kaisha, Kariya, Japan

[21] Appl. No.: 302,233

[22] Filed: Sep. 8, 1994

Related U.S. Application Data

[63] Continuation of Ser. No. 951,737, Sep. 28, 1992, abandoned.

[30] Foreign Application Priority Data

Sep. 26, 1991 [JP] Japan ................................ 3-247997

[51] Int. Cl.⁶ .................................................. B60T 8/60
[52] U.S. Cl. ........................... 303/198; 303/165; 303/185; 303/22.1; 303/194; 303/196
[58] Field of Search ................................ 303/111, 100, 303/112, 102, 103, 106, 107, 108, 109, 110, 91, 92, 93, 94–99, 104, 9.69, 22.1, 198, 165, 185; 188/195, 181 T; 364/426.01, 426.02, 426.03; 180/197

[56] References Cited

U.S. PATENT DOCUMENTS

| | | | |
|---|---|---|---|
| 3,544,172 | 12/1970 | Howard et al. | 303/92 |
| 3,717,384 | 2/1973 | Harned | 303/107 |
| 3,727,992 | 4/1973 | Bowler et al. | 303/107 |
| 3,825,308 | 7/1974 | Kasselmann et al. | 303/100 |
| 3,890,013 | 6/1975 | Coiner | 303/100 X |
| 3,909,071 | 9/1975 | Klatt | 303/106 |
| 4,093,316 | 6/1978 | Reinecke | 303/100 |
| 4,327,948 | 5/1982 | Beck et al. | 303/96 |
| 4,402,047 | 8/1983 | Newton et al. | 303/100 X |
| 4,418,966 | 12/1983 | Hattwig | 303/100 |
| 4,701,855 | 10/1987 | Fennel | 180/197 |
| 4,755,008 | 7/1988 | Imoto et al. | 303/111 X |
| 4,778,223 | 10/1988 | Inoue | 303/100 |
| 5,000,281 | 3/1991 | Nobumoto et al. | 303/100 X |
| 5,040,120 | 8/1991 | Hoffmann | 180/197 |

FOREIGN PATENT DOCUMENTS

| | | |
|---|---|---|
| 60-154947 | 8/1985 | Japan. |
| 62-31554 | 2/1987 | Japan. |

*Primary Examiner*—Douglas C. Butler
*Attorney, Agent, or Firm*—Sughrue, Mion, Zinn, Macpeak & Seas

[57] ABSTRACT

An anti-skid control for use in an automotive vehicle is comprised of a brake control device for adjusting braking force of each road-wheel of a vehicle, the brake control device being set to be initiated upon receipt of a condition, a detecting device being set to be initiated upon receipt of a condition, a detecting device for measuring a load applied to the vehicle, and a changing device for less sensitivity of the initiation of the brake control device as the load decreases. Even if an instantaneous decrease of the load occurs due to the vehicle's jumping motion or turning motion, an expected initiation of the brake operation can be prevented.

1 Claim, 10 Drawing Sheets

1

SKID CONTROL SYSTEM

This is a Continuation of application Ser. No. 07/951,737 filed Sep. 28, 1992, now abandoned.

BACKGROUND OF THE INVENTION

The present invention relates to an anti-skid control system for use in an automotive vehicle, and in particular to an anti-skid control system for controlling braking force applied to road-wheels in braking operation to prevent the road-wheels from being locked.

Conventionally, there has been provided an anti-skid control system for reducing a braking distance. In the conventional anti-skid control system, the adjustment of the braking distance is attained by adjusting the braking force to be applied to a road-wheel taking into consideration the deceleration of the road-wheel, the slip rate thereof, and other factors as disclosed in Japanese Patent Laid-open Prints No. Sho 60-154947 and No. Sho 62-314554 published without examination in 1985 and 1987, respectively. In the conventional anti-skid control system, an initiation of an anti-lock control is established when a speed of the road-wheel is decreased relative to a target vehicle speed, or a deceleration of the road-wheel is increased relative to a target vehicle deceleration.

Sometimes, upon a jumping motion or a turning motion of the vehicle, the road-wheel may move away from the road surface, which will bring a temporary decrease of the load applied to the road-wheel. In general, the less the load is applied to the road-wheel, the more the road-wheel is apt to be brought into locked condition. If any one of such situations occurs, due to the decrease of the load, the road-wheel is apt to be locked, thereby increasing the slip rate thereof. Thus, the decrease of the speed of the road-wheel relative to the vehicle-speed, the increase of deceleration of the road-wheel relative to the vehicle-speed will establish an initiation of the anti-skid control. The anti-skid control system decreases the braking pressure for the prevention of the locked condition of the road-wheel. Thereafter, if the load recovers as it was, depending on this recovery, the braking pressure is also increased. However, it takes a time for the recovery of the braking pressure as it was, which brings an early initiation of the anti-skid control resulting in the prolongation of the braking distance.

SUMMARY OF THE INVENTION

It is, therefore, a primary object of the present invention to provide an anti-skid system which prevents the prolongation of a braking distance upon a jumping motion or a turning motion of the vehicle.

In order to attain the foregoing objects, an anti-skid control for use in an automotive vehicle is comprised of brake control means for adjusting braking force of each road-wheel of a vehicle, brake control means being set to be initiated upon receipt of a condition, detecting means for measuring a load applied to the vehicle, and changing means for less sensitivity of the initiation of the brake control means as the load decreases.

The above and other objects, features and advantages of the present invention will be more apparent and more readily appreciated from the following detailed description of a preferred exemplary embodiment of the present invention, taken in connection with the accompanying drawings.

DESCRIPTION OF THE PREFERRED EMBODIMENTS

Embodiments of the present invention will be described hereinafter in detail with reference to the accompanying drawings.

Figure 2:
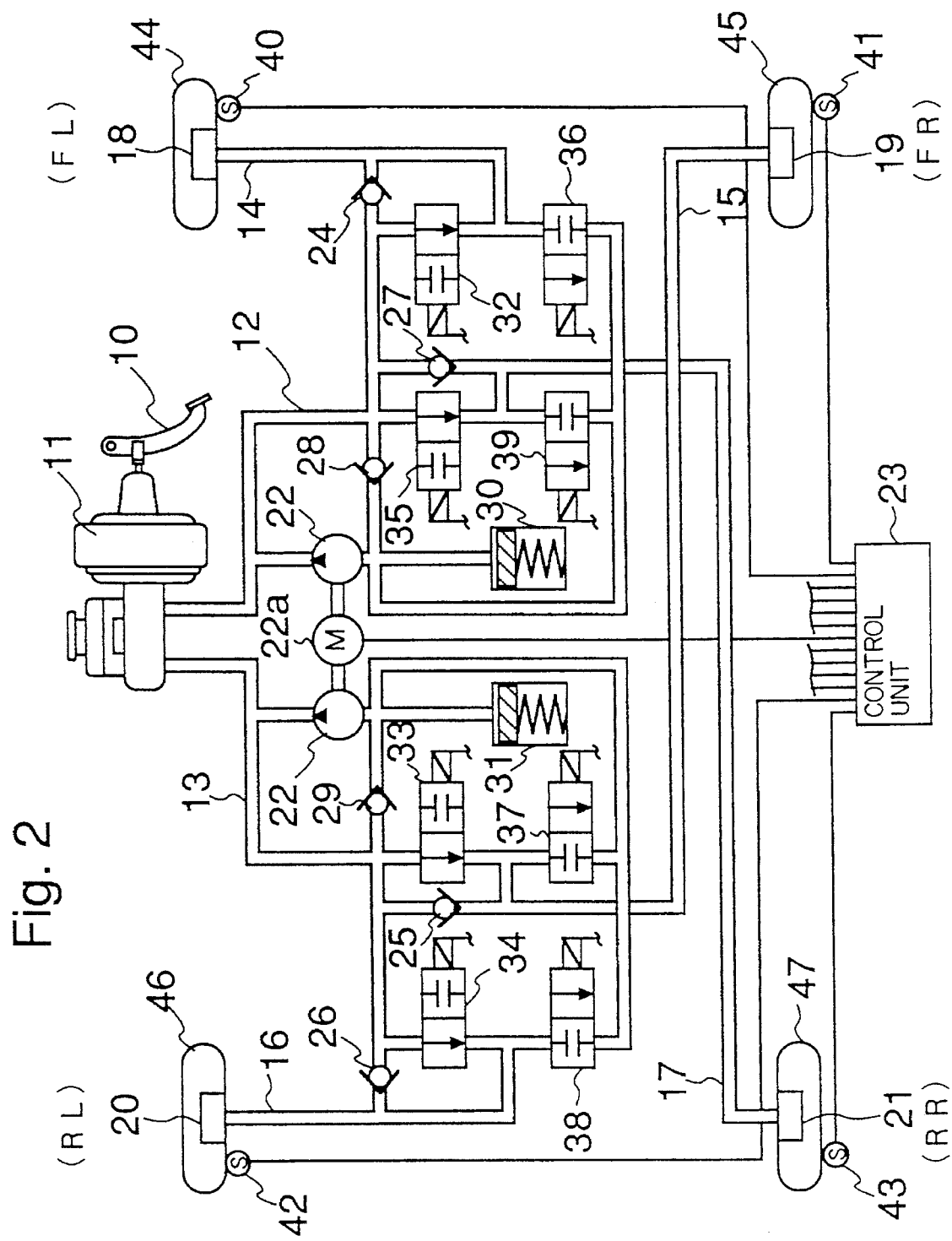
FIG. 2 is a shows an overall structure of an anti-skid system according to the present invention.

Referring first to FIG. 2, an overall structure of a pressure circuit of an anti-skid control system is shown. Conduits 12 and 13 are connected to a master cylinder 11. The conduit 12 is connected, via an electromagnetic valve 32 and a one-way valve 24, to a conduit 14 which is in fluid communication with a wheel cylinder 18 of a front-left road-wheel 44. The conduit 14 is also connected via an electromagnetic valve 36 to a drain 30. The conduit 12 is connected via an electromagnetic valve 35 and a one-way valve 27 to a conduit 17 which is in fluid communication with a wheel cylinder 21 of a rear-right road-wheel 47. The conduit 17 is connected to the drain 30 via an electromagnetic valve 39.

The conduit 13 is connected, via an electromagnetic valve 33 and a one-way valve 25, to a conduit 15 which is in fluid communication with a wheel cylinder 19 of a front-right road-wheel 45. The conduit 15 is also connected via an electromagnetic valve 37 to a drain 31. The conduit 13 is connected via an electromagnetic valve 34 and a one-way valve 26 to a conduit 16 which is in fluid communication with a wheel cylinder 20 of a rear-left road-wheel 46. The conduit 16 is connected to the drain 31 via an electromagnetic valve 38.

Each one-way valve is set to be opened, when an inner pressure of the corresponding wheel cylinder is above the pressure in the conduit 12 (13), for returning the braking pressure thereto, which leads to a prevention of an excessive supply of the braking pressure to each road-wheel. Each of the electromagnetic valves 32, 33, 34 and 35 is a normally opened type valve, and is set to be closed when energized or actuated. Each of the electromagnetic valves 36, 37, 38 and 39 is a normally closed type valve, and is set to be opened when energized or actuated. Thus so long as no electromagnetic valves are being energized or actuated, the fluid communication of the conduit 12 with the conduits 14 and 17 is established as well as the fluid communication of the conduit 13 with the conduits 15 and 16. Upon depression of a brake pedal 10, the master cylinder 11 increases the fluid pressure in each of the conduits 12 and 13. The resultant pressure increase is transmitted to the wheel cylinders 18, 19, 20 and 21 for regulating the rotation of the road-wheels 44, 45, 46 and 47, respectively. This means that the braking force depends on the degree of the depression of the brake pedal 10.

A pair of pumps 22 and 22 are set to be driven by a motor 22a. Outlet ports of the pumps 22 and 22 are connected to the conduits 12 and 13, respectively. As previously described, during the de-energized condition of each of the electromagnetic valves, the conduit 12 (13) is in fluid communication with the wheel cylinders 18 and 21 (19 and 20). Under such condition, if the motor 22a is driven or turned on, the inner pressure of each of the wheel cylinders 18, 19, 20 and 21 can be increased. Then both of the electromagnetic valves 32 and 36 are energized, the electromagnetic valves 32 and 36 are closed and opened, respectively, and the fluid in the wheel cylinder 18 is drained into the drain 30. Thus, activation of the electromagnetic valves 32 and 36 will decrease the inner pressure of the wheel cylinder 18 of the front-left road-wheel. Similarly, the inner pressures of the wheel cylinder 21 of the rear-right road-wheel 47, the wheel cylinder 21 of the front-right road-wheel 45, and the wheel cylinder 20 of the rear-left road-wheel 46 can be decreased by the actuations of the electromagnetic valves 35 and 39, the electromagnetic valves 33 and 37 and the actuations of the electromagnetic valves 34 and 38, respectively. The foregoing operation of each combination of two electromagnetic valves enables the increase of the inner pressure of the wheel cylinder, which results in the adjustment of the control of the respective road-wheel. The motor 22a and the electromagnetic valves are under the control of an electric control unit 23 which is in the form of a microprocessor or CPU. It is to be noted that a one-way valve 28 (29) is disposed between the conduit 12 (13) and the drain 30 (31) in order that when the pressure in the drain 30 (31) exceeds a set value, the pressure is returned to the conduit 12 (13).

Figure 3:
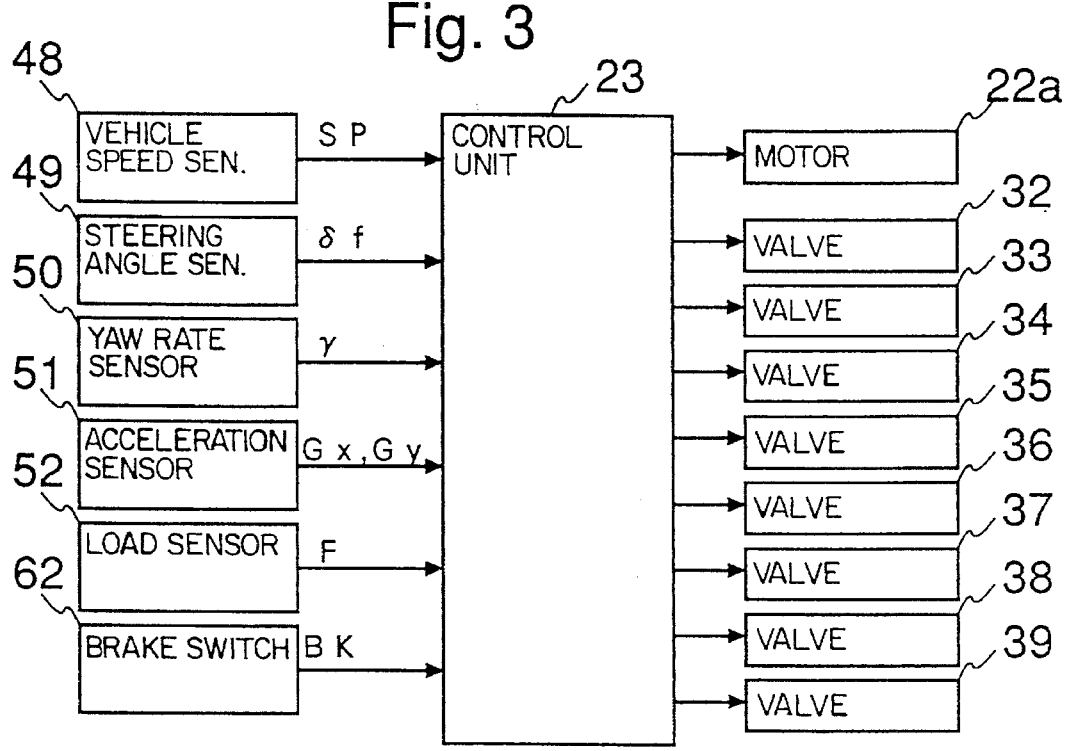
FIG. 3 is a block diagram showing the relationship between an electric control unit and each of the sensors.

Sensor means 40, 41, 42 and 43 are provided to the front-left road-wheel 44, the front-right road-wheel 41, the rear-left road-wheel 46 and the rear-right road-wheel 47, respectively, in order to feed signals relating to the conditions thereof to the electric control unit 23. Each sensor means 40/41/42/43 includes a vehicle speed sensor 48 and a load sensor 52 (FIG. 3). As shown in FIG. 3, the vehicle speed sensor 48 is set to detect the rotational speed of each road wheel and the resulting speed is fed as pulse signals SP to the control unit 23. The load sensor 52 is set to detect a load F applied to each road-wheel. This load sensor 52 can be used as an estimated load sensor which estimates the load on the basis of a sprung acceleration, an upsprung acceleration, a vehicle-height and a pressure from the suspension. In addition to the foregoing sensors, the control unit 23 is connected with a steering angle sensor 49 detecting a steering angle δ f, a yaw rate sensor 50 detecting a yaw rate γ, and an acceleration sensor 51 detecting accelerations GX and GY in the longitudinal and lateral directions, respectively, of the vehicle-body. The control unit 23 is also connected with a brake switch 62 which detects the depression of the brake pedal 10. On the basis of signals from the sensors 48 through 52, the control unit 23 is set to operate the motor 22a, and the electromagnetic valves 32 through 39.

Figure 4:
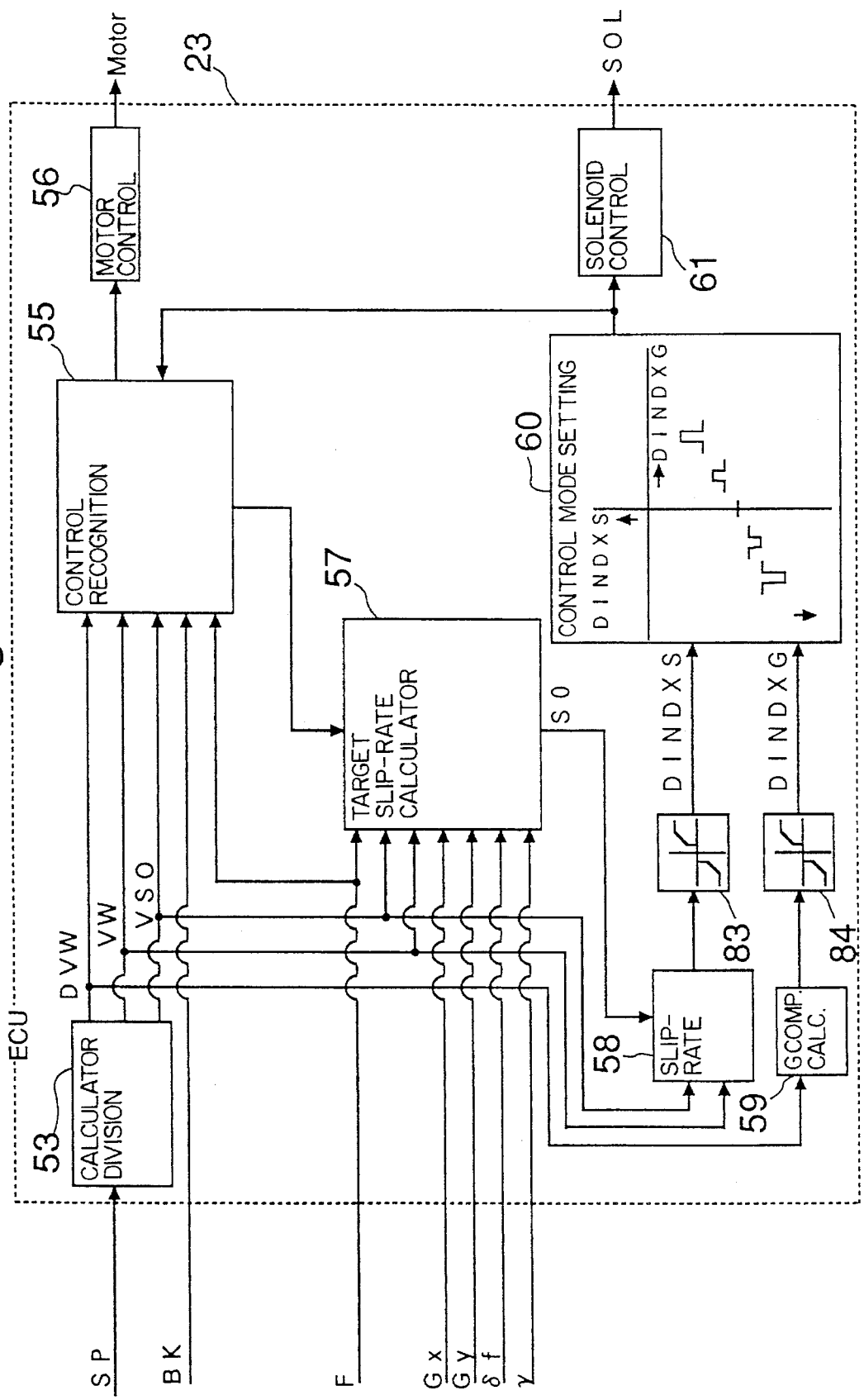
FIG. 4 is a block diagram showing a detailed structure of an electric control unit.
Figure 5:
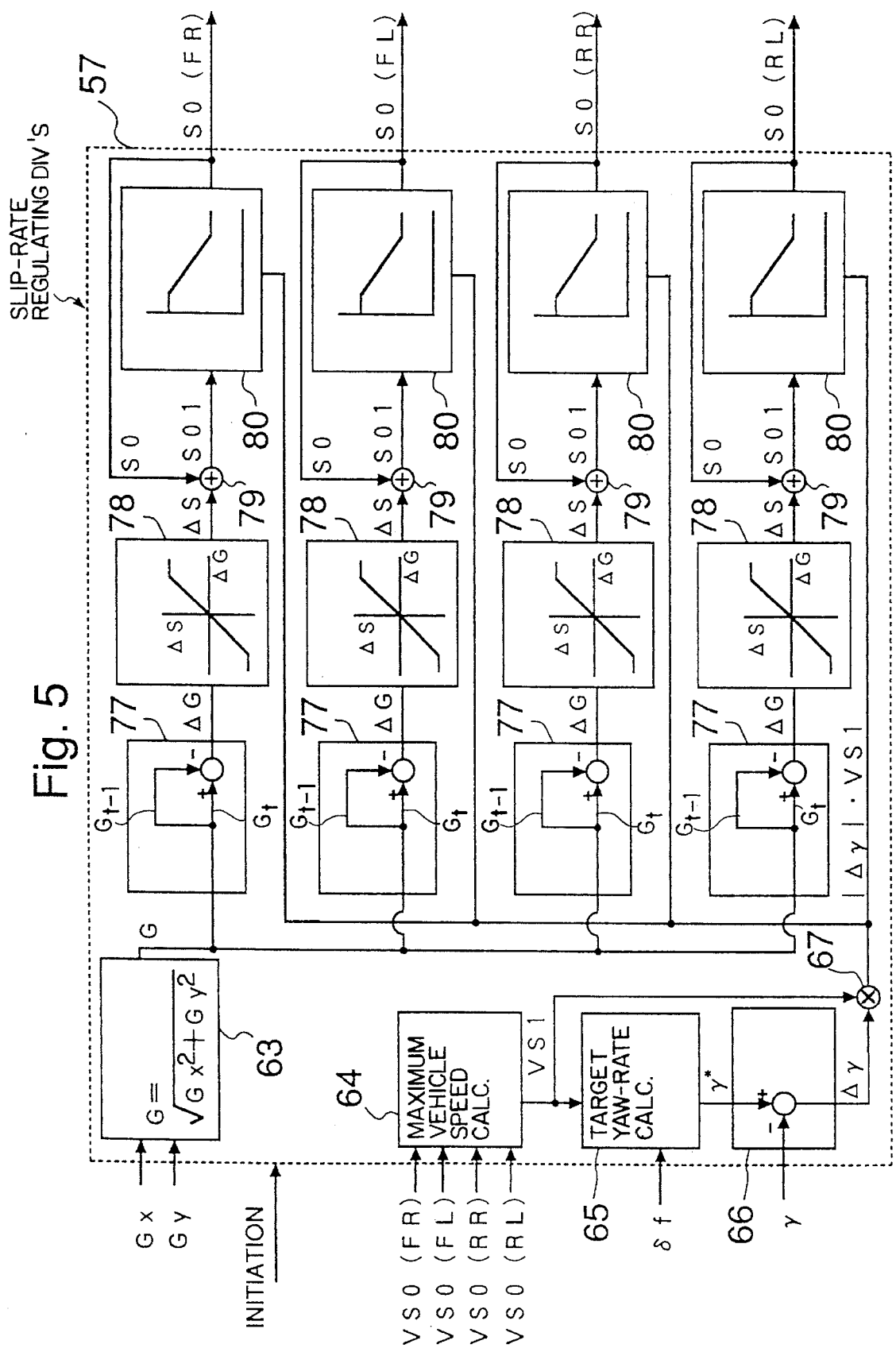
FIG. 5 is a block diagram showing a detailed structure of a target slip rate calculating division of an electric control unit.

The control unit 23, as shown in FIG. 4, includes a calculating division 53 for calculating the vehicle speed, the acceleration and the estimated speed, a road-surface condition recognition division 54, an initiation/termination of the control recognition division 55, a motor control division 56, a target slip rate calculating division 57, a slip rate component calculating division 58, a G-component calculating division 59, a control mode setting division 60 and a solenoid control division 61. In the road-surface condition recognition division 54, the condition of a road surface is recognized on the basis of the wheel speed and other factors. The initiation/termination of the control recognition division 55 is set to make a decision whether an ABS control should be established or not. The motor control division 56 drives the motor 22a for generating the fluid pressure depending on the ABS control condition. IN the target slip rate calculating division 57, a target slip rate of each road-wheel is set to be calculated. In the slip rate component calculating division 58 and the G-component calculating division 59, a slip rate and an acceleration component for setting the control mode are calculated, respectively. IN the control mode setting division 60, on the basis of the slip rate and the acceleration component, the control mode for each road-wheel are obtained. In the solenoid control division 61, on the basis of the resultant control mode in the control mode setting division 60, the electromagnetic valves are controlled corresponding to each road-wheel in order to adjust the fluid pressure of the wheel cylinder, thereby adjusting the slip condition of each road-wheel. It is to be noted that the road-wheels 44, 45, 46 and 47 are set to be controlled independently by the foregoing divisions other than the initiation/termination of the control recognition division 55 and the motor control division 56.

Hereinafter each division of the control unit will be detailed. In the calculating division 53, a rotational acceleration DVW, a rotational speed VW, and an estimated vehicle speed VSO of each road-wheel are calculated on the basis of the signal SP from the respective wheel speed sensor 48. The estimated speed is defined as the vehicle speed at a portion thereof at which each road-wheel is provided. The rotational speed of VW is set to be calculated based on the radius of each road-wheel and the width of pulse (or a periodic time) of the signal SP. The rotational acceleration DVW is obtained by differentiating the rotational speed of VW with respect to time t. The estimated vehicle speed VSO of each road-wheel is obtained from the respective rotational speed of VW in light of the turning motion of the vehicle and other factors.

The initiation/termination of the control recognition division 55 establishes an initiation and a termination of the anti-skid control based on a brake output BK of the brake switch 62, the estimated vehicle speed VSO, the rotational acceleration DVW, the rotational speed VW. If the brake switch 62 is in on-condition and the estimated vehicle speed VSO is within a range, the anti-skid control is deemed to be initiated. A control of this division will be detailed later.

In the motor control division 56, upon receipt of signals for the initiation and termination from the initiation/termination of the control recognition division 55, the motor 22a is turned on and turned off, respectively.

The target slip rate calculating division 57 is set to calculate the target slip rate on the basis of the longitudinal acceleration GX, the lateral acceleration GY, the steering angle δ f, the real yaw rate γ, the load F and the estimated vehicle speed VSO. The detailed structure of the calculating division 57 is illustrated in FIG. 4.

The maximum deceleration G is obtained at a maximum deceleration calculating unit 63 by using the following formula (1).

$$G=(GX^2+GY^2)^{1/2} \qquad (1)$$

The maximum vehicle speed V1 is obtained, at a maximum vehicle speed calculating unit 64, as the maximum value of the estimated vehicle speed VSO of each road-wheel. As for the yaw rate deviation Δγ, first of all, a target yaw rate γ* is obtained at a target yaw rate calculating unit 65 by using the following formula (2).

$$\gamma^*=(G_B \times \delta f)/(1+\tau S) \times VS1/(1+Kh \times VS1^2) \qquad (2)$$

The yaw rate deviation Δγ is calculated at a Δγ–calculating unit 66 by using the following formula (3).

$$\Delta\gamma=\gamma^*-\gamma \qquad (3)$$

Figure 6:
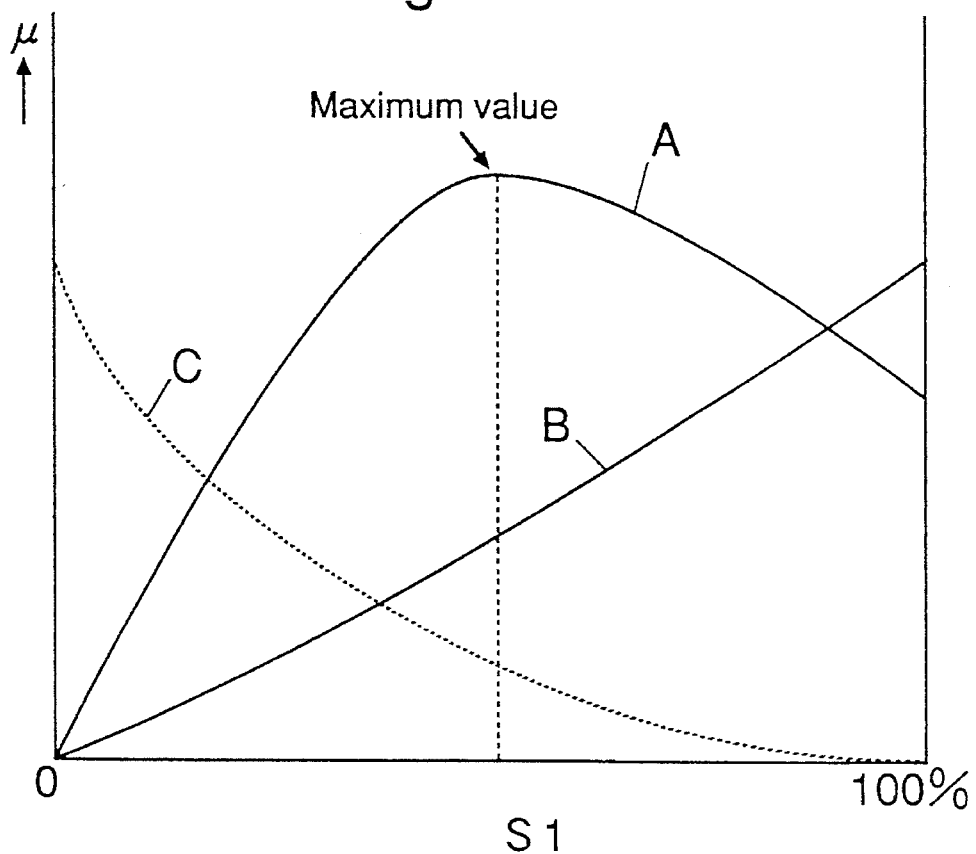
FIG. 6 is a block diagram showing a $\mu$ -S table of an electric control unit.

The acceleration G obtained at a maximum deceleration calculating division 63 is fed to the ΔG calculating division 77 to be subtracted by the latest acceleration Gt-1 for obtaining an increment ΔG of the acceleration. At a ΔS calculating division 78, a slip rate increment ΔS is calculated on the basis of the resulting increment ΔG of the acceleration with reference to a graph shown in FIG. 6. An addition of the resulting slip rate increment ΔS and the latest target slip rate S0t-1 brings a current target slip rate S01.

In the foregoing processing, if the deceleration increases with the passing of time, ΔG and ΔS become positive, resulting in the increase of the target slip rate. Thus the slip quantity of each road-wheel is increased, which leads to the increase of the vehicle's deceleration being restricted. On the other hand, if the deceleration decreases with the passing of time, ΔG and ΔS become negative, resulting in the decrease of the target slip rate. Thus the slip quantity of each road-wheel is decreased, by which the vehicle's deceleration is increased. Thus the continuation of the foregoing processing will bring the maximum value of deceleration. As for the relationship between the deceleration and the slip rate, as indicated with real lines A and B shown in FIG. 6, the deceleration is proved to be of only one maximum value, which results in that this maximum value is the greatest value of the deceleration. That is, in the foregoing processing, except for the slip rate regulating portion 80, remaining elements serve for obtaining the target slip rate which brings the greatest deceleration. On a normal or ordinal road, as indicated with the line A, the μ attains its maximum value when the slip rate is about 10–20%. The μ is in proportion with the deceleration. Thus, a control for establishing 10–20% slip rate minimizes the braking distance. Contrary to this, on the gravel road, the locking condition of the road-wheel brings the minimum braking distance. In such a situation, as for the relationship between the μ and slip rate, the μ attains its maximum value when the slip rate is 100%. In the anti-skid control system, even on such a road, the control is established in order to realize the maximum value of the deceleration. This system ensures the maximum deceleration regardless of the road condition, which results in the minimization of the braking distance on any road.

In the foregoing processing, the acceleration to be maximized is detected by the acceleration sensor. Instead, the differential value of the vehicle-speed VS0 for each road-wheel is available. In addition, in light of the fact that the μ is calculated or obtained on the basis of the acceleration G and the load F, the maximizing of such μ for each road-wheel is also available. In such case, if the load changes, for precise control, it is desirable to take into consideration the load.

Figure 7:
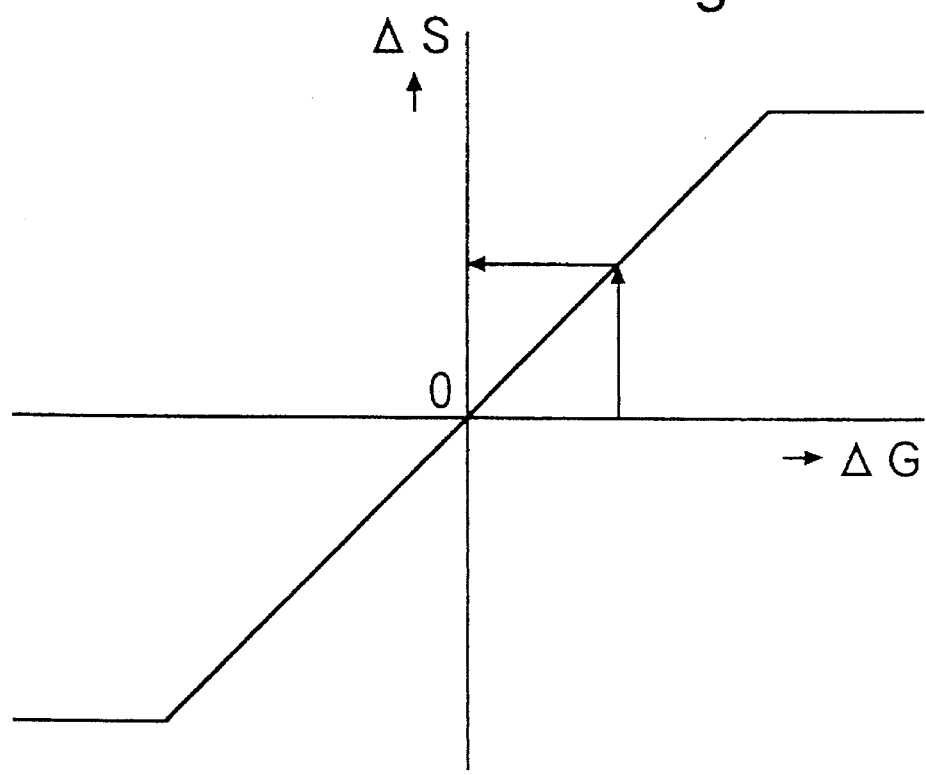
FIG. 7 is a graph showing an operation of a $\Delta$ S calculating portion of an electric control unit.
Figure 8:
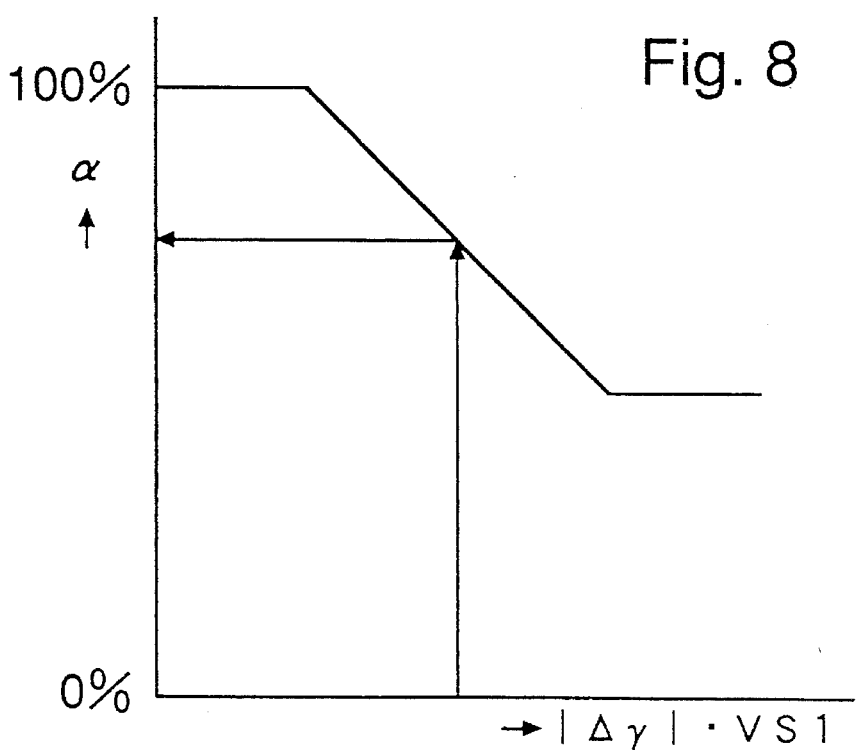
FIG. 8 is a graph showing an operation of a slip rate regulating portion of an electric control unit.

Thus, the obtained target slip rate S01 is restricted at a slip rate restricting portion 80 to which a product of the maximum vehicle speed VS1 and the absolute value of the yaw rate deviation Δγ obtained at the calculating division 67 is provided. At the rate restricting portion 80, a rate α is obtained with reference to a graph shown in FIG. 7 depending on the value of the foregoing product. The resulting rate α is multiplied with the target slip rate S01 for the calculation of the target slip rate S01. The target slip rate S01 is decreased as the maximum vehicle speed VS1 increases or the absolute deviation of the yaw rate deviation Δγ increases. Thus, so long as the steering operation is in coincidence with the actual turning motion of the vehicle, the foregoing control for changing the maximum deceleration is established. If the steering operation becomes out of coincidence with the actual turning motion of the vehicle, the target slip rate is set to be decreased for effecting the cornering force.

Referring back to FIG. 4, the obtained target slip rate is set to be fed to the component calculating division 58 and on the basis of the following formula (5) the slip rate component DINDXS is calculated.

$$DINDXS=S0-(VS0-VW-IVW-BVW)/VSO \qquad (4)$$

where IVW is an integrated value of the rotational speed of the wheel VW and BVW is a constant.

Figure 12:
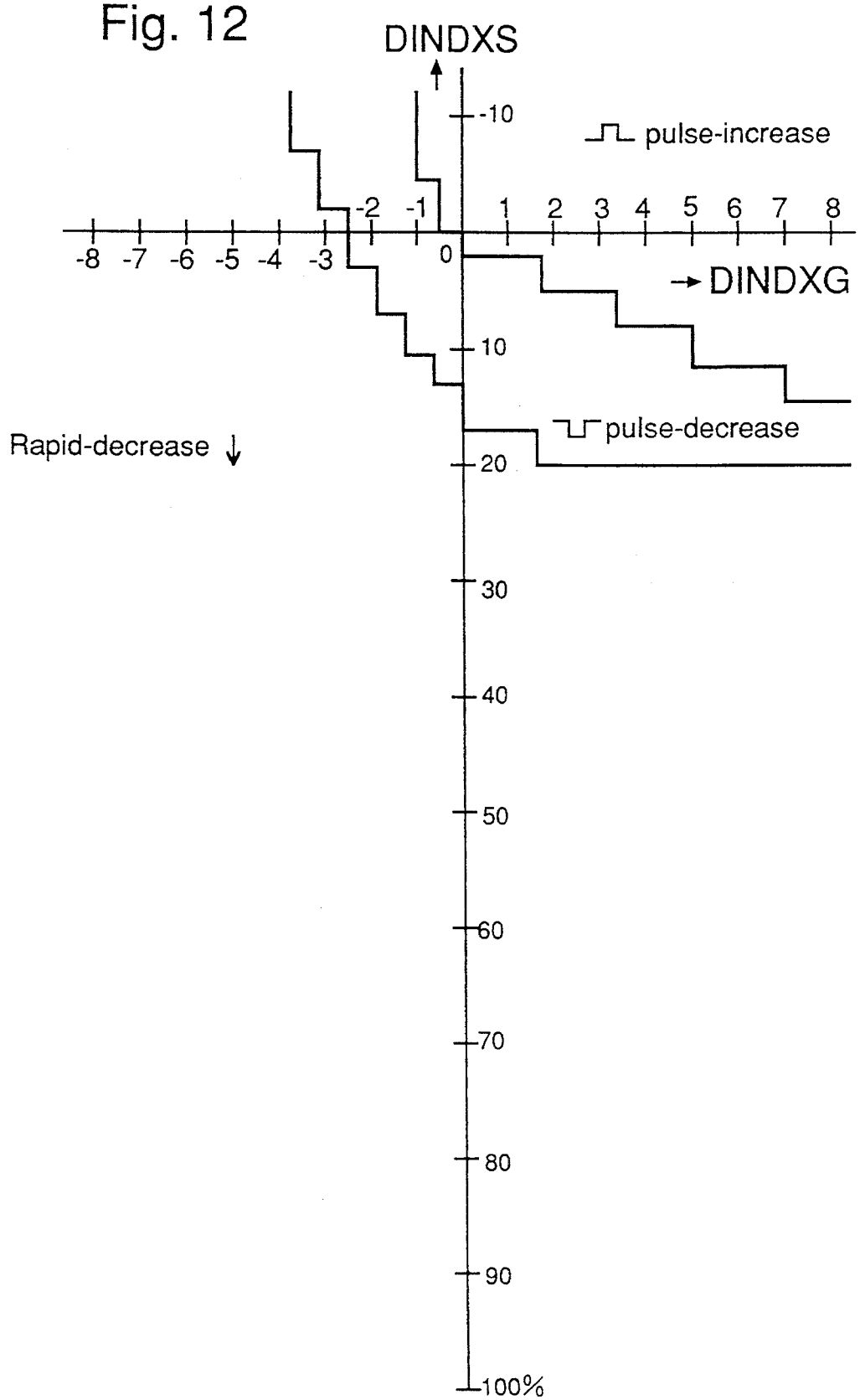
FIG. 12 is a graph showing an operation of a control mode setting division of an electric control unit.

In this formula, (VS0–VW)/VS0 corresponds to the real slip rate S1. The slip rate component DINDXS is then fed via a limiter 83 to the control mode setting division 60. As shown in FIG. 12, if the slip rate component DINDXS is less than a value the limiter 83 establishes a blind zone or an invalid zone wherein the output is set to be zero. The reason is to prevent the control in response to a noise included in the slip rate component DINDXS. As a result of the blind zone, the foregoing integrated value IVW serves for the correction of the slip rate when the slip rate component DINDXS is generated within a minute range for a long time. The constant BVW serves for increasing a deviation between the target slip rate and the real slip rate when the rotational speed VW is low. As the vehicle speed becomes higher, VSO becomes extremely large relative to BVW and thus BVW becomes neglectably small. Thus, the slip rate component DINDXS is a substantial modification of a value which is obtained by subtracting the real slip rate form the target slip rate S0 and shows a slip rate deviation.

In the G-component calculating division 59, a G-component is obtained by subtracting a set value G0 from the rotational acceleration DVW. Like the slip rate component DINDXS, the G-component is fed via a limiter 84 to the control mode setting division 60.

Figure 9:
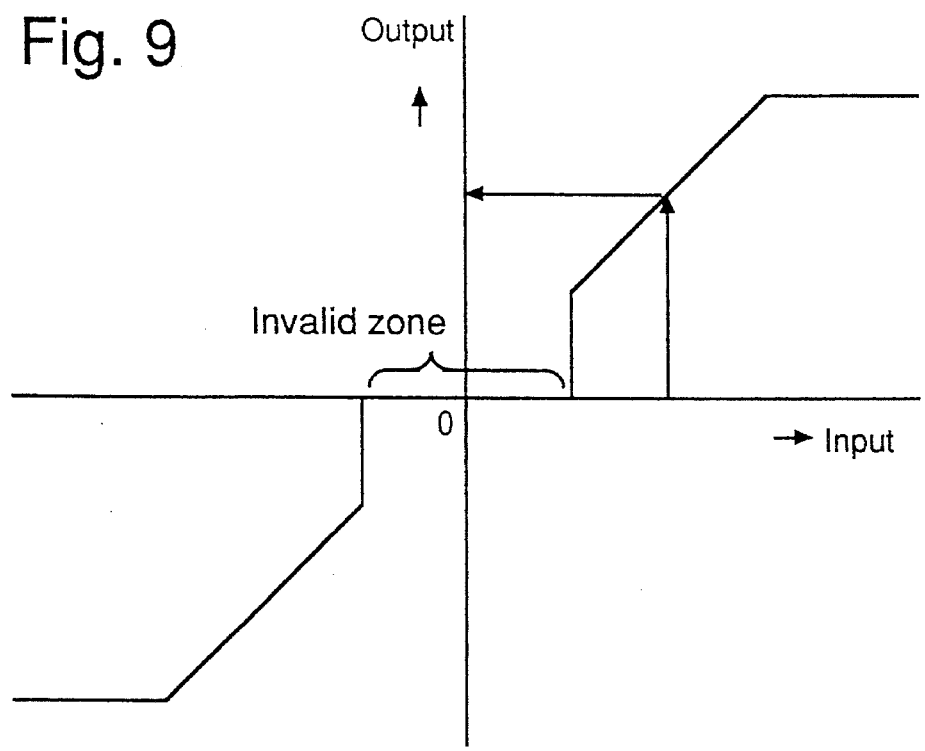
FIG. 9 is a block diagram of an invalidating division of an electric control unit.

The control mode setting division 60 begins to set a control mode upon receipt of the slip rate component DINDXS and the G-component. Three modes: the pulse-increase mode, the pulse-decrease mode and the rapid-decrease mode are available. As described previously, the pressure in each of the wheel cylinders is increased thereby to increase the braking force when the electromagnetic valves 32–35 are opened, and the pressure in each of the wheel cylinders is decreased thereby to decrease the braking force when the electromagnetic valves 36–39 are opened. In the pulse-increase mode, upon the closure of each of the electromagnetic valves 36–39, each of the electromagnetic valves 32–35 is set to be under the duty control for increasing the braking pressure wherein a pulse width and an opening time of each of valves 32–35 are adjusted. In the pulse-decrease mode, upon the closure of each of the electromagnetic valves 32–35, each of the electromagnetic valves 36–39 is set to be under the duty-control for decreasing the braking pressure wherein a pulse width and an opening time of each of valves 36–39 are adjusted. In the rapid-decreasing mode, the pressure in each of the wheel cylinders is rapidly decreased by establishing a condition wherein valves 32–35 are closed and the valves 36–39 are opened. At the mode setting division 60, concurrently with setting the foregoing three modes, the valve opening time and the pulse width are set in case of the pulse-increasing mode or the pulse decreasing mode. The setting of each mode is established based on a graph shown in FIG. 9. In this graph, in principle, as the slip rate increases the pulse-increasing mode, the pulse-decreasing mode and the rapid-decreasing mode are set to be established in such order, and as the acceleration decreases the pulse-increasing mode, the pulse-decreasing mode and the rapid-decreasing mode are set to be established in such order. That is, when the G-component is 0, the pulses are increased slightly in case the deviation between the target slip rate and the real slip rate is 0, and as the slip rate deviation increases, the pulse-decreasing mode and the rapid-decreasing mode are established in turn. In the graph, under this situation, corrections are set to be made toward the pulse-increasing mode and the pulse-decreasing mode when the deceleration is increased and decreased, respectively. Thus the braking force is so adjusted to establish a coincidence of the target slip rate with the real slip rate, resulting in that ultimately this coincidence is attained. Since this adjustment is made precisely according to the acceleration, the quick control can be established.

The solenoid control division 61 serves for controlling the electromagnetic valves 32 through 39 based on the set mode at the control mode setting division 60, the valve opening time, the valve closing time and the periodic time. In the pulse-increasing mode, the electromagnetic valves 36–39 are entirely closed and the electromagnetic valves 32–35 are opened for a set time. The electromagnetic valves 32–35 are closed for a remaining time in a period. This opening and closing operation of each of the electromagnetic valves 32–35 are repeated. In the pulse-decreasing mode, the electromagnetic valves 32–35 are entirely closed and the electromagnetic valves 36–39 are opened for a set time. The electromagnetic valves 36–39 are closed for a remaining time in a period. This opening and closing operation of each of the electromagnetic valves 36–39 is repeated.

Figure 1:
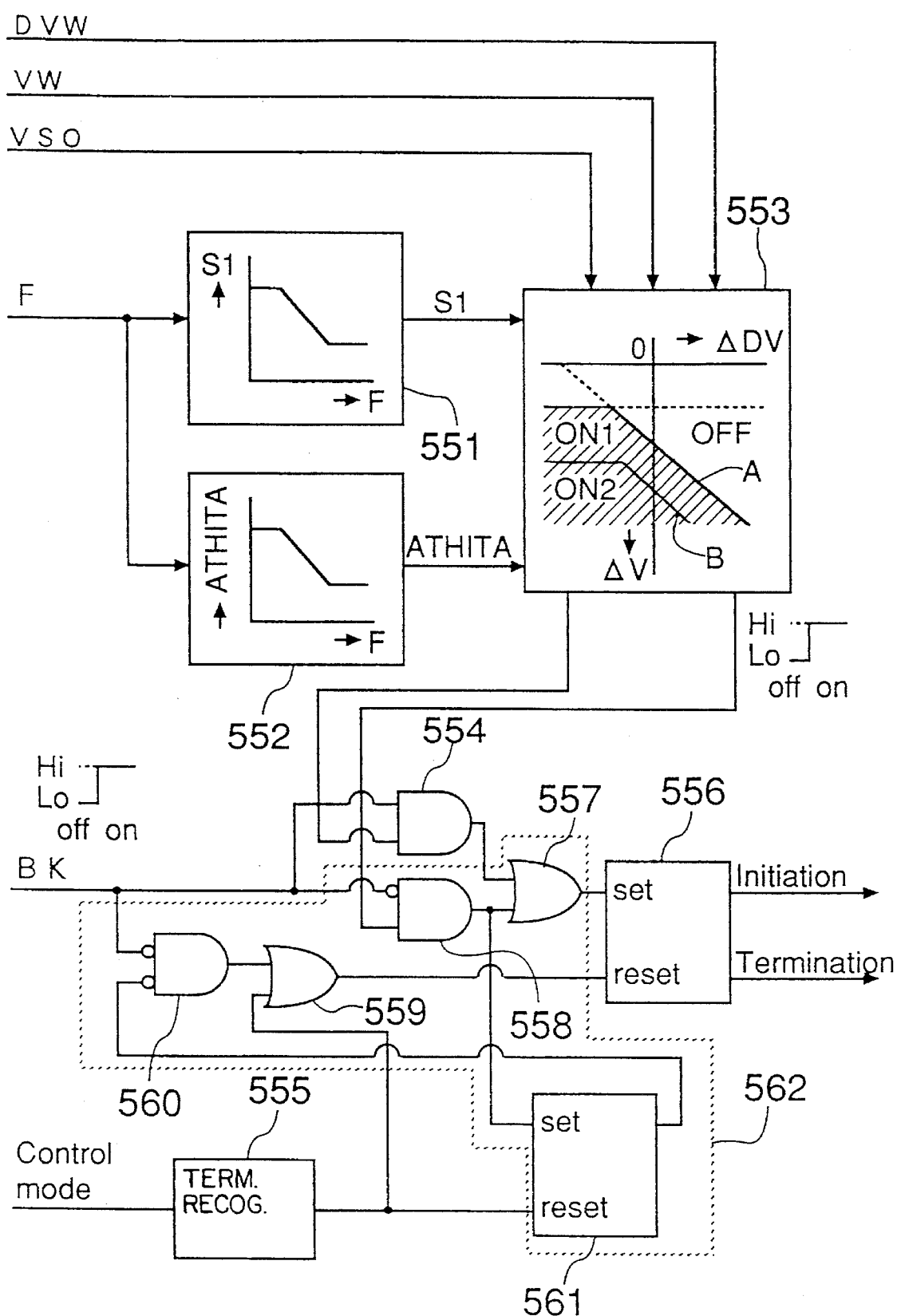
FIG. 1 is a block diagram showing an initiation/termination decision division of an anti-skid system according to the present invention.

An initiation is set to be recognized by the foregoing control recognition division 55 which has, as shown in FIG. 1, an initiation slip rate setting portion 551, a prohibit slip rate portion 552, an initiation recognition port 553, an AND-gate 554, a termination recognition portion 555, an initiation/termination control portion 556, and a brake system checking portion 562. A reference numeral S1 denotes the initiation slip rate when the ignition of the control is permitted. A reference numeral ATHITA is the prohibit slip rate when the initiation of the control is prohibited by a reason other than the acceleration. The initiation recognition port 553 makes a decision on the initiation of the control based on the initiation slip rate S1, the prohibit slip rate ATHITA, the road-wheel acceleration DVW, the road-wheel speed VW, and the estimated vehicle speed VSO. If the initiation condition is established and the brake pedal is depressed, an output of the AND-gate 554 becomes ON, by which the initiation/termination control portion 556 indicates the initiation of the control. It is to be noted that if the initiation condition ON1 is established, in addition to the initiation of the control, a flip-flop in the brake system checking portion 562 is established. The brake system checking portion 562 serves for the detection of a disconnection such as a malfunction of the brake switch 62, a removal of a connector therefrom, or a wire-breaking. If such disconnection occurs, the output BK from the brake switch 62 is fixed to L0. In such a case, the brake system checking portion 562 permits the initiation of the control at a deep slip rate. The initiation/termination control portion 556 is in the form of a flip-flop, is set by the output of the AND-gate 554 and is reset by the output of the termination recognition portion 555. The termination recognition portion 555, according to the control mode of each road-wheel, makes a decision that the completion of the pressure increase of the road-wheel establishes the termination of the control. If no disconnection is found, since the output of the flip-flop 561 is L0, upon off-condition of the brake switch 62, an output Hi is established at an AND-gate 560, which results in the reset of the initiation/termination control portion 556 via an OR-gate 559. Thus despite the off-condition of the brake switch 62, the termination of the control is established. In case of the disconnection, the output of the AND-gate 560 remains L0, by which no reset (termination of the control) of the initiation/termination control portion 556 by the closure of the brake switch 62 is established.

Further detailed explanation will be described. For each road-wheel, the slip rate S1 and ATHITA are set depending on the load F. The initiation slip rate S1 is set at initiation slip rate setting portion 551 in accordance with a graph shown in FIG. 10. As will be apparent from this graph, the initiation slip rate S1 is set to be S11 when the load F is not less than a set value of F2. IF the load F is less than a set value of F1, the initiation slip rate S1 is set at a deep value of S12 (for front road-wheels) or S13 (for rear road-wheels). The prohibit slip rate ATHITA is to be set, in accordance with a graph shown in FIG. 11, at the prohibit slip rate portion 552. As apparent from this graph shown in FIG. 11, the prohibit slip rate ATHITA is set to be A1 when the load is not less than a set value of F4. If the load F is less than a set value of F3, the prohibit slip rate ATHITA is set at a deep value of A2 (for front road-wheels) or A3 (for rear road-wheels). Front road-wheels differ from rear road-wheels in both the slip rates S1 and ATHITA. This is due to the fact more deep slip rate is required at rear road-wheels for ensuring the stability of the vehicle.

The initiation slip rate S1, the prohibit slip rate ATHITA, the road-wheel acceleration DVW, the road-wheel speed VW and the estimated vehicle speed VSO are so fed to the initiation recognition portion 553 as to check whether the condition for the initiation is established or not. First of all, the estimated vehicle speed is differentiated for obtaining an estimated vehicle acceleration DVS0. Next, by using the formula (5), a speed deviation ΔV is calculated. In addition, on the usage of the formula (6), an acceleration deviation ΔDV is calculated. Furthermore, an inhibit speed TTHITA is calculated by using the formula (7).

$$\Delta V = VSO \cdot (1-S1) - VW \qquad (5)$$

$$\Delta DV = DVW - DVS0 \qquad (6)$$

$$THITA = VSO \cdot ATHITA + CTHITA \qquad (7)$$

where CTHITA is a constant.

Figure 13:
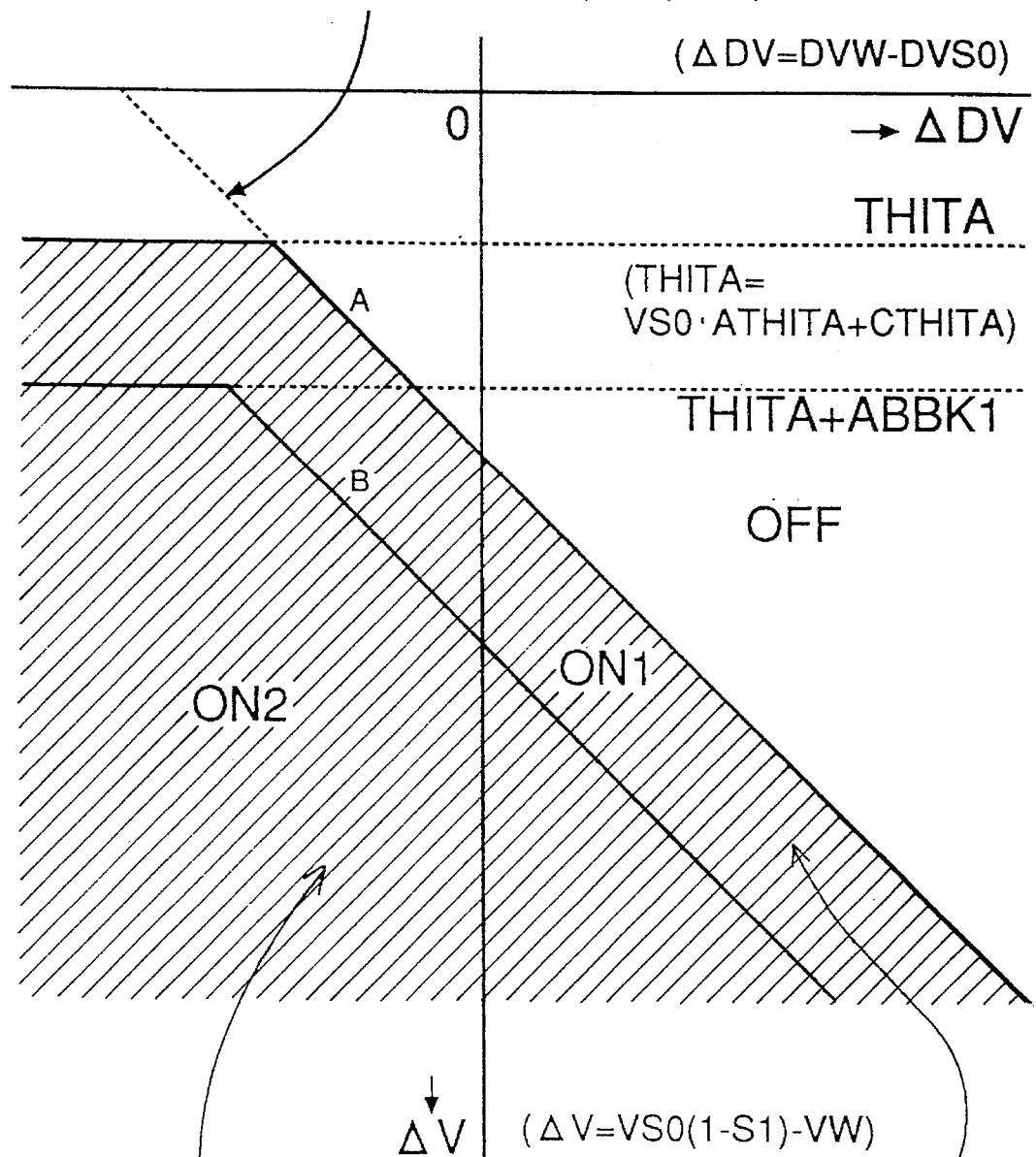
FIG. 13 is a graph showing an operation of an initiation/termination decision division of an electric control unit.

If both of the following formulas (8) and (9) are established, the condition for the initiation of the control under which no disconnection is found in the system is deemed to be established. In FIG. 13, this condition is established within a range of ON1.

$$SSOLC > GK \cdot \Delta DV - DV \tag{8}$$

where each of SSOLC and GK is a constant.

$$\Delta V < THITA \tag{9}$$

Figure 14:
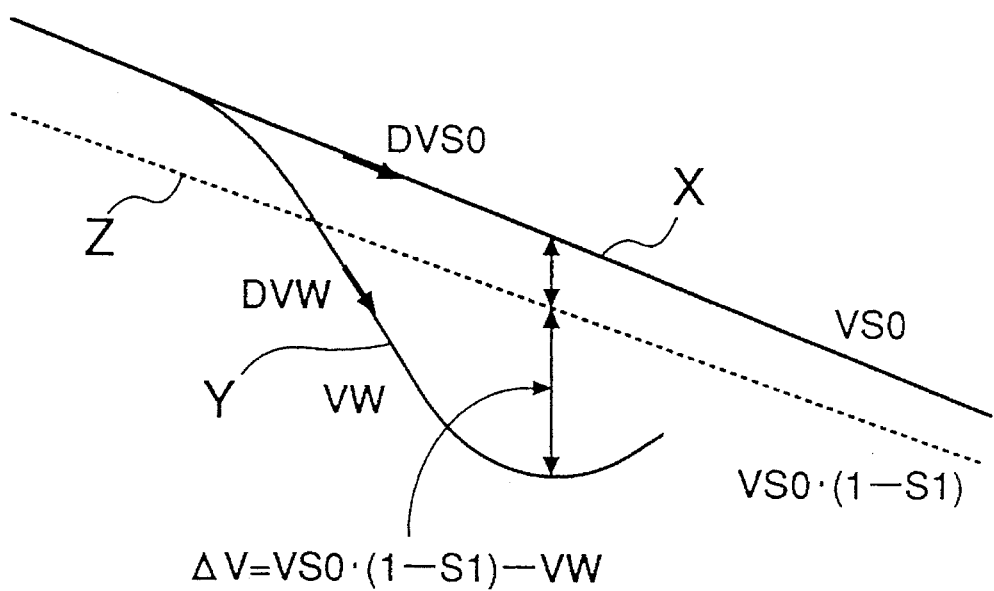
FIG. 14 is a graph showing an operation of an anti-skid control.

Each of the foregoing relationships will be described with reference to FIG. 14. Upon deceleration of the vehicle due to the brake operation by depressing the brake pedal, the vehicle speed VS0 of the vehicle decreases as indicated by X. Contrary to this, when the road-wheel is going to be locked, the road-wheel speed VW, as indicated by Y, drops rapidly. Since S1 designates the target initiation slip rate, a phantom-line indicated by Z designates the road-wheel speed to be controlled. If the road-wheel speed VW is below this phantom-line Z, the control is required. If the speed deviation ΔV is large, the control is required. The acceleration deviation ΔDV is a difference between the estimated vehicle acceleration DVSO and the vehicle acceleration DVW. If acceleration deviation ΔDV moves large in the minus direction, the control should be established. In the present invention, a time when the control is to be initiated is determined on the basis of the relationship as indicated by the foregoing formula (8). As previously mentioned, the speed deviation ΔV is a function of the target initiation slip rate S1. As the target initiation slip rate S1 increases, the speed deviation ΔV decreases. This leads to the increase of the right side in the formula (8), which results in that the establishment thereof becomes more difficult. Thus the increase of the target initiation slip rate S1 will disturb the sensitivity of the initiation of the control.

Further, regardless of the acceleration deviation ΔDV, if the speed deviation ΔV is not greater than the inhibit speed THITA, the initiation of the control is prevented. As mentioned above, the inhibit speed THITA is a function of the vehicle speed VS0 and the prohibit slip rate ATHITA. As the vehicle speed or the prohibit slip rate ATHITA increases, the inhibit speed THITA increases. This results in that a region within which the control is to be initiated becomes narrow, which leads to the poor sensitivity of the initiation of the control.

As mentioned above, the initiation slip rate setting portion 551 and the prohibit slip rate portion 552 serve as both a control initiation sensitivity setting means and a control initiation sensitivity changing means which establishes poor sensitivity of the control initiation as the load F decreases. Upon decrease of the load F, the target initiation slip rate S1 and the prohibit slip rate ATHITA decrease, which results in the poor sensitivity of the initiation of the control. Thus, if the vehicle moves, during its deceleration motion, away from the road surface, the poor sensitivity of the initiation of the control is realized resulting in the prevention of unnecessary control. Similarly, upon turning motion of the vehicle wherein the load of road-wheel of one side decreases, the poor sensitivity of the initiation of the control is realized, resulting in the prevention of unnecessary control.

Next, the initiation condition (ON2) when the disconnection is found in the brake system will be described. In principle, it is similar to the foregoing initiation condition (ON2) except that instead of the formulas (8) and (9), the formulas (10) and (11), respectively, are used.

$$SSOLC > GK \cdot \Delta DV - DV + ABBK2 \tag{10}$$

where ABBK2 is a constant.

$$\Delta V < THITA + ABBK1 \tag{11}$$

where ABBK1 is a constant.

If both formulas (10) and (11) are established concurrently, the control is initiated though its sensitivity is poor.

Figure 10:
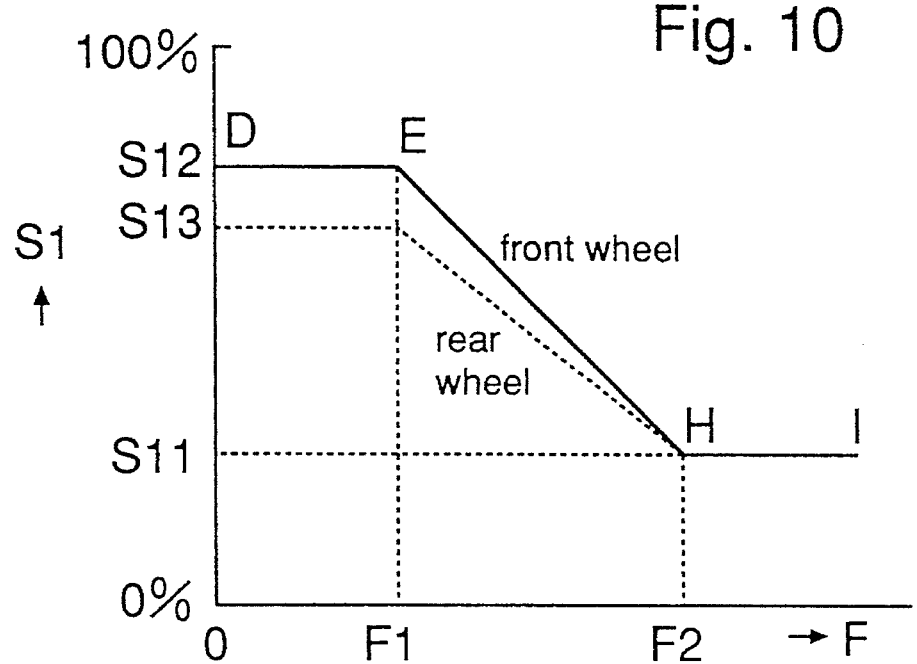
FIG. 10 is a graph showing a control initiation slip rate setting portion of an electric control unit.
Figure 11:
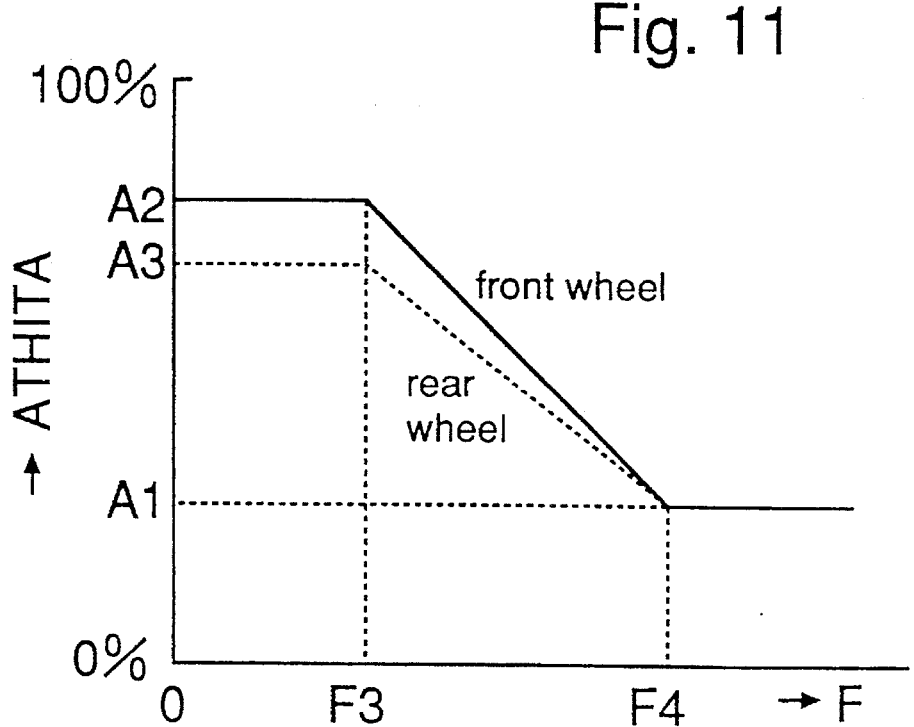
FIG. 11 is a graph showing a control initiation inhibiting slip rate setting portion of an electric control unit.

As mentioned above, the initiation slip rate setting portion 551 and the prohibit slip rate portion 552 serve for adjusting the sensitivity of the initiation of the control with reference to graphs shown in FIGS. 10 and 11. In FIG. 10, between lines D and E, the gain is 100% and the speed deviation ΔV is sufficiently less than the prohibit speed THITA, resulting in that no control is initiated. Between lines E and H, as the load decreases the less sensitivity of the initiation of the control is set to be established. Thus as the load decreases, the sensitivity of the initiation of the control becomes poor. If the load is less than a set value, no control is initiated. Alternative methods can be available for obtaining the foregoing result. That is, a higher slip rate can be set depending on the load decrease without setting of 100% slip rate upon no load. In addition, by letting F1=F2 in order to delete a region for establishing poor sensitivity gradually, rapid establishment of less sensitivity of the initiation of the control when the load is less than a value is available. In the foregoing, the time when the initiation is to be established is obtained on the basis of the vehicle speed deviation ΔV and the vehicle acceleration deviation ΔDV, only one of them can be used for the calculation of the time.

It is to be noted that the present invention is directed to the initiation of the anti-skid control which has no relation to how the control is established.

The invention has thus been shown and described with reference to a specific embodiment, however, it should be noted that the invention is in no way limited to the details of the illustrated structures but changes and modifications may be made without departing from the scope of the appended claims.

We claim:

1. An anti-skid control system for use in an automotive vehicle having wheels comprising:

braking means operable only upon operation of a brake pedal for applying a braking force to said wheels;

speed sensor means and load sensor means operably associated with each wheel;

brake control means for independently adjusting the braking force applied to each wheel;

initiation slip rate setting means for setting the initiation slip rate for each wheel depending upon load applied to each wheel to determine when initiation of said brake control means is permitted; and prohibit slip rate setting means for setting the prohibit slip rate for each wheel depending on load applied to each wheel to determine when initiation of said brake control means is prohibited;

said initiation slip rate setting means and said prohibit slip rate setting means constitute both a brake control initiation sensitivity setting means and a brake control initiation sensitivity changing means, whereby upon decrease of the load during vehicle deceleration, the initiation slip rate and the prohibit slip rate increase which results in poor sensitivity of the initiation of said brake control means.

* * * * *